(12) United States Patent
Takahashi et al.

(10) Patent No.: US 7,890,588 B2
(45) Date of Patent: Feb. 15, 2011

(54) UNWANTED MAIL DISCRIMINATING APPARATUS AND UNWANTED MAIL DISCRIMINATING METHOD

(75) Inventors: Masaru Takahashi, Yokohama (JP); Takeshi Sugiyama, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 859 days.

(21) Appl. No.: 11/431,840

(22) Filed: May 11, 2006

(65) Prior Publication Data

US 2006/0259561 A1    Nov. 16, 2006

(30) Foreign Application Priority Data

May 11, 2005  (JP)  ............................ P2005-138908
Aug. 15, 2005  (JP)  ............................ P2005-235445

(51) Int. Cl.
*G06F 15/16* (2006.01)

(52) U.S. Cl. ....................................... 709/206; 709/203

(58) Field of Classification Search ................. 709/203, 709/206
See application file for complete search history.

(56) References Cited

U.S. PATENT DOCUMENTS

| 6,507,866 | B1 * | 1/2003 | Barchi | 709/207 |
| 7,092,992 | B1 * | 8/2006 | Yu | 709/206 |
| 2005/0147221 | A1 * | 7/2005 | Aoki | 379/88.22 |
| 2005/0188036 | A1 * | 8/2005 | Yasuda | 709/206 |
| 2005/0240617 | A1 * | 10/2005 | Lund et al. | 707/102 |
| 2006/0031298 | A1 | 2/2006 | Hasegawa | |
| 2006/0069732 | A1 * | 3/2006 | Shannon et al. | 709/206 |
| 2006/0168024 | A1 * | 7/2006 | Mehr et al. | 709/206 |

FOREIGN PATENT DOCUMENTS

| JP | 2003-150513 | 5/2003 |
| JP | 2003-249964 | 9/2003 |
| JP | 2004-21623 A | 1/2004 |
| WO | WO 2004/010662 A1 | 1/2004 |

* cited by examiner

*Primary Examiner*—Joon H Hwang
*Assistant Examiner*—Thomas Lee
(74) *Attorney, Agent, or Firm*—Oblon, Spivak, McClelland, Maier & Neustadt, L.L.P.

(57) ABSTRACT

Whether mail transmitted is unwanted mail is discriminated even in a case where the mail is transmitted from a zombie PC is determined by an unwanted mail discriminating apparatus. The unwanted mail discriminating apparatus has a mail receiver for receiving e-mail; an information extractor for extracting discrimination information for discrimination on whether or not unwanted mail, from the e-mail received; a reliability evaluating part (a sender information reliability evaluator and a URL information reliability evaluator) for connecting to a reliability evaluation database storing information corresponding to the discrimination information, which is for evaluating reliability of the discrimination information, and for evaluating the reliability of the extracted discrimination information with reference to the information stored in the reliability evaluation databases; and a discriminator for discriminating whether the received e-mail is unwanted mail, based on the reliability of the discrimination information evaluated.

4 Claims, 17 Drawing Sheets

Fig.2

WE ARE A CORPORATION.

...

...

URL 1

Fig.3

| RECIPIENT INFORMATION | NAME OF CONTRACT CORPORATION |
|---|---|
| RECIPIENT 1 | A CORPORATION |
| RECIPIENT 2 | B CORPORATION |
| ... | ... |

Fig.4

| URL INFORMATION | PAST ACCESS COUNT |
|---|---|
| URL1 | 5 |
| URL2 | 3 |
| ... | ... |

UNWANTED MAIL DISCRIMINATING APPARATUS AND UNWANTED MAIL DISCRIMINATING METHOD

BACKGROUND OF THE INVENTION

1. Field of the Invention

The present invention relates to an unwanted mail discriminating apparatus for discriminating whether e-mail is unwanted mail, and to an unwanted mail discriminating method in the apparatus.

2. Related Background of the Invention

The existing typical measures against unwanted mail (spam), such as phishing scams, include one using a blacklist. The details of this are described, for example, in JP-A 2003-150513 which is a Japanese Patent Application Laid-Open. The blacklist is, for example, a list of mail addresses, IP (Internet Protocol) addresses, or domains subject to rejection of reception. The measure against unwanted mail with the blacklist is to acquire the foregoing information from the header of e-mail and to compare the information with the information in the list, thereby discriminating whether the e-mail is unwanted mail. The measures against phishing mail further include a measure using a blacklist containing URLs (Uniform Resource Locators) of phishing sites.

Another typical measure is one using a whitelist. The whitelist is, for example, a list of mail addresses, IP addresses, or domains subject to permission of reception, and mail from senders other than those in the list is not delivered.

In addition to the above measures, there is the Sender ID framework as a method recently drawing attention. This framework involves managing a list of IP addresses of authorized servers that are permitted to transmit mail of a certain domain. If one attempts to send mail with a false origin by making use of a mail server unrelated to the domain, the receiver side will detect it and automatically reject reception thereof. This can prevent senders of unwanted mail from utilizing a mail address including a popular domain name, such as a major provider.

SUMMARY OF THE INVENTION

However, the above measures had the following problem. If a host or terminal is hijacked with a virus to become a zombie PC (Personal Computer) and if unwanted mail is transmitted therefrom, the method using the blacklist or the whitelist, or the sender ID framework will fail to discriminate whether the mail is unwanted mail, and thus the recipient will fail to block the unwanted mail. The reason for it is that these measures specify the mail origins (addresses) and guarantee the validity of the mail origins, but do not guarantee the validity of mail itself (contents). The zombie PC is a PC hijacked or the like through an unauthorized tool by a third party and PC that can be freely manipulated from a remote place.

The present invention has been accomplished in order to solve the above problem, and an object of the invention is to provide an unwanted mail discriminating apparatus and unwanted mail discriminating method capable of discriminating whether mail transmitted is unwanted mail, even in the case where the mail is transmitted from a zombie PC.

An unwanted mail discriminating apparatus according to the present invention comprises mail receiving means for receiving e-mail; information extracting means for extracting discrimination information to be used for discrimination on whether or not unwanted mail, from the e-mail received by the mail receiving means; database connecting means for connecting to a reliability evaluation database storing information corresponding to the discrimination information, for evaluating reliability of the discrimination information; reliability evaluating means for evaluating the reliability of the discrimination information extracted by the information extracting means, with reference to the information stored in the reliability evaluation database to which the database connecting means connects; and discriminating means for discriminating whether the e-mail received by the mail receiving means is unwanted mail, based on the reliability of the discrimination information evaluated by the reliability evaluating means.

The unwanted mail discriminating apparatus according to the present invention is configured to extract the discrimination information from e-mail, to evaluate the reliability of the extracted information, and to discriminate whether the e-mail is unwanted mail, based on the reliability evaluated. Namely, the unwanted mail discriminating apparatus of the present invention performs the discrimination on whether or not unwanted mail, based on the evaluation of the reliability of the discrimination information, instead of simply performing the discrimination based on the information such as mail addresses or IP addresses. Therefore, the apparatus is able to discriminate whether the mail transmitted is unwanted mail, even in the case where unwanted mail is transmitted from a zombie PC with which the source is authenticated from its mail address or IP address.

Preferably, the information extracting means extracts the discrimination information from a main body of the e-mail. This configuration permits the apparatus to extract more appropriate discrimination information in the discrimination of unwanted mail.

Preferably, the discrimination information extracted by the information extracting means contains sender information to specify a sender of the e-mail, and the reliability evaluation database, to which the database connecting means connects, stores information of a contractual relation between a recipient and the sender of the e-mail. This configuration permits the apparatus to extract the discrimination information more securely, which facilitates practice of the present invention.

Preferably, the discrimination information extracted by the information extracting means contains link information for access to a site on a communication network, and the reliability evaluation database, to which the database connecting means connects, stores information of an access count to the site. This configuration permits the apparatus to extract the discrimination information more securely, which facilitates the practice of the present invention.

Preferably, the reliability evaluating means evaluates for an e-mail group containing identical discrimination information, the reliability of the discrimination information contained in the e-mail group, and the discriminating means discriminates whether the e-mail group is unwanted mail, based on the reliability of the discrimination information evaluated for the e-mail group by the reliability evaluating means. In this configuration, whether or not unwanted mail is discriminated based on a plurality of e-mail messages, which enables execution of the discrimination with higher reliability. In addition, an appropriate discrimination can be made even in cases where the reliability evaluation database contains no high-accuracy information.

Preferably, the discrimination information extracted by the information extracting means contains sender information to specify a sender of the e-mail, the reliability evaluation database, to which the database connecting means connects, stores information of a contractual relation between each recipient and the sender of the e-mail, and the reliability evaluating means evaluates the reliability, based on a number of contractual relations between recipients and the sender of the e-mail in the e-mail group. This configuration permits the apparatus to evaluate the reliability more securely and, in turn, to perform more appropriate discrimination.

Preferably, the discrimination information extracted by the information extracting means contains link information for access to a site on a communication network, the reliability evaluation database, to which the database connecting means connects, stores information of an access count to the site, for each recipient of the e-mail, and the reliability evaluating means evaluates the reliability, based on a distribution of access counts to the site by recipients of the e-mail in the e-mail group. This configuration permits the apparatus to evaluate the reliability more securely and, in turn, to perform more appropriate discrimination.

Preferably, the information extracting means sequentially transmits the extracted discrimination information to the reliability evaluating means, and, every time the reliability evaluating means receives the discrimination information transmitted from the information extracting means, the reliability evaluating means evaluates the reliability of the discrimination information for the e-mail group, based on a preset standard, from the e-mail the discrimination information of which has been transmitted up to that time, among the e-mail group. This configuration reduces the processing load associated with the discrimination information in the evaluation of the reliability of the discrimination information, and thus reduces the processing in the unwanted mail discriminating apparatus.

Incidentally, the present invention can be described as the invention of the unwanted mail discriminating apparatus as described above and can also be described as the invention of an unwanted mail discriminating method as described below. This is different only in category but is substantially the same invention, with much the same action and effect.

An unwanted mail discriminating method according to the present invention is an unwanted mail discriminating method in unwanted mail discriminating apparatus, comprising: a mail receiving step of receiving e-mail; an information extracting step of extracting discrimination information to be used for discrimination on whether or not unwanted mail, from the e-mail received in the mail receiving step; a database connecting step of connecting to a reliability evaluation database storing information corresponding to the discrimination information, for evaluating reliability of the discrimination information; a reliability evaluating step of evaluating the reliability of the discrimination information extracted in the information extracting step, with reference to the information stored in the reliability evaluation database connected in the database connecting step; and a discriminating step of discriminating whether the e-mail received in the mail receiving step is unwanted mail, based on the reliability of the discrimination information evaluated in the reliability evaluating step.

In the present invention, as described above, whether or not unwanted mail is discriminated based on the evaluation of the reliability of the discrimination information, different from the discrimination simply based on the information such as the mail address or IP address. Therefore, the present invention allows us to discriminate whether mail transmitted is unwanted mail, even in the case where unwanted mail is transmitted from a zombie PC with which the source is authenticated from its mail address or IP address.

BRIEF DESCRIPTION OF THE DRAWINGS

FIG. 2 is a drawing showing an example of a main body of e-mail, and discrimination information contained in the main body and extracted therefrom.

FIG. 3 is a drawing showing a table of a contractual information database.

FIG. 4 is a drawing showing a table of an access count database.

DESCRIPTION OF THE PREFERRED EMBODIMENTS

The preferred embodiments of the unwanted mail discriminating apparatus and unwanted mail discriminating method according to the present invention will be described below in detail with reference to the drawings. The same elements will be denoted by the same reference symbols in the description of the drawings, without redundant description.

Figure 1:
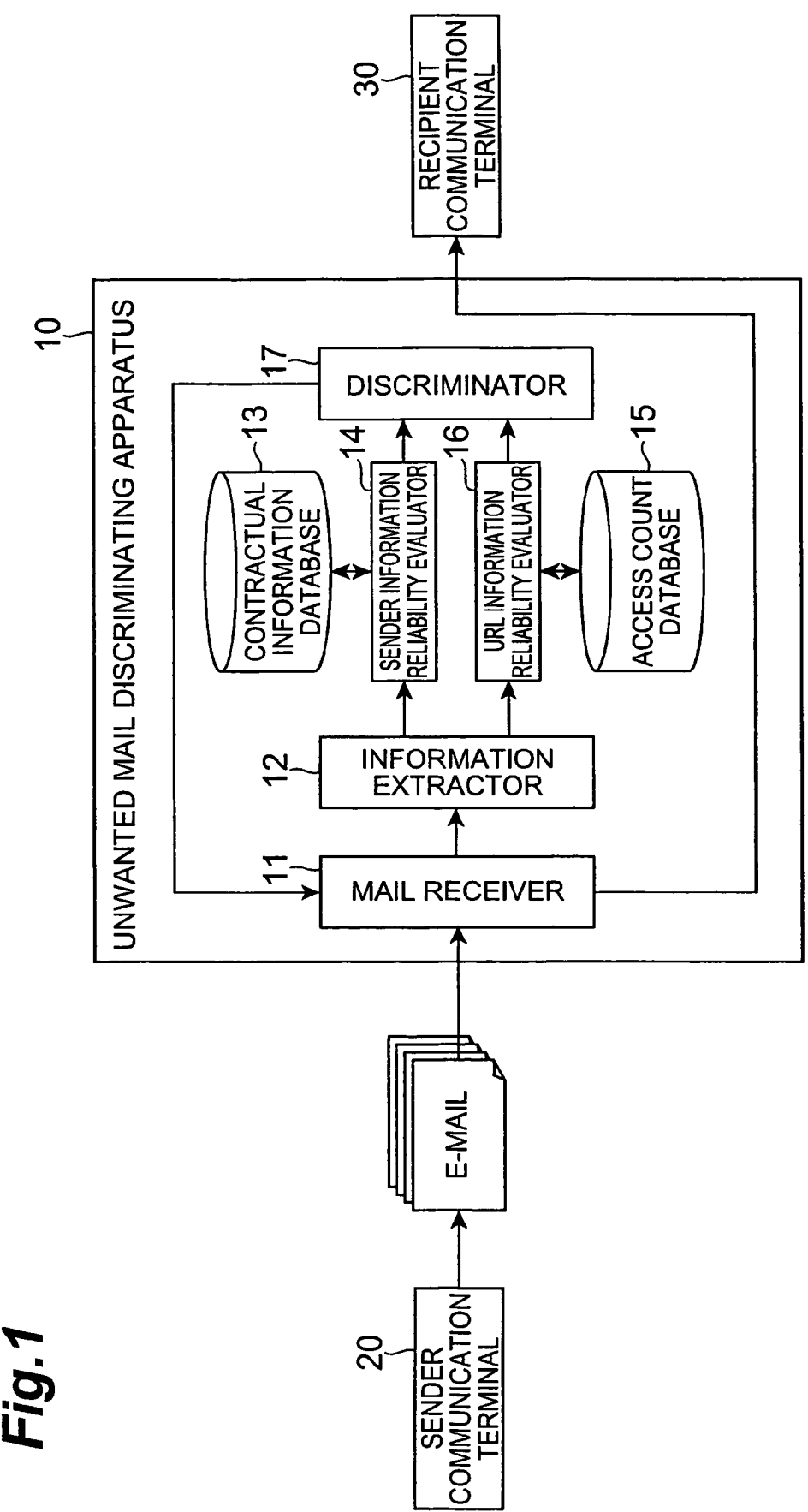
FIG. 1 is a diagram showing a configuration of an unwanted mail discriminating apparatus according to an embodiment of the present invention.

FIG. 1 shows the unwanted mail discriminating, apparatus 10 of the present embodiment. The unwanted mail discriminating apparatus 10 is connected to a communication network such as the Internet, and is configured to receive e-mail from sender communication terminal 20 and to transmit the e-mail to recipient communication terminal 30 which is a destination designated in the e-mail, as shown in FIG. 1. Namely, the unwanted mail discriminating apparatus 10 functions as a mail server. FIG. 1 depicts the sender communication terminal 20 and recipient communication terminal 30 one each, but there are a plurality of sender communication terminals 20 and recipient communication terminals 30 in ordinary circumstances. The e-mail received by the unwanted mail discriminating apparatus 10 is normally only e-mail messages with destinations being specific recipient communication terminals 30 (e.g., user terminals within a network of its own).

The unwanted mail discriminating apparatus 10 discriminates whether e-mail received is unwanted mail. A specific example of the unwanted mail as an object to be discriminated is phishing mail. The phishing mail is such e-mail that a sender pretends to be an existing bank, credit card company, or the like, and sends e-mail to make a user access a link in the sent e-mail and enter a credit card number and password, thereby illegally acquiring them and practicing a "phishing scam."

The unwanted mail discriminating apparatus 10 is specifically substantialized by a server unit composed of a CPU (Central Processing Unit), memories, and so on. As shown in FIG. 1, the unwanted mail discriminating apparatus 10 is functionally composed of mail receiver 11, information extractor 12, contractual information database 13, sender information reliability evaluator 14, access count database 15, URL information reliability evaluator 16, and discriminator 17.

The mail receiver 11 is a mail receiving means for receiving e-mail transmitted from sender communication terminal 20. The mail receiver 11 also functions as a mail server, for example, to interpret a destination of e-mail and to transmit the e-mail to recipient communication terminal 30 corresponding to the destination. The content of the e-mail received by the mail receiver 11 is transmitted to the information extractor 12, in order to discriminate whether the e-mail is phishing mail.

The information extractor 12 is an information extracting means for extracting discrimination information to be used for discrimination on whether or not unwanted mail, from the e-mail received by the mail receiver 11. In the present embodiment the discrimination information is sender information to specify the sender of the e-mail, and link information for access to a site on the communication network. A specific example of the sender information is a name of a company being a transmitting entity of the e-mail, or the like. A specific example of the link information for access to the site on the communication network is URL information used in the present embodiment.

Figure 2:
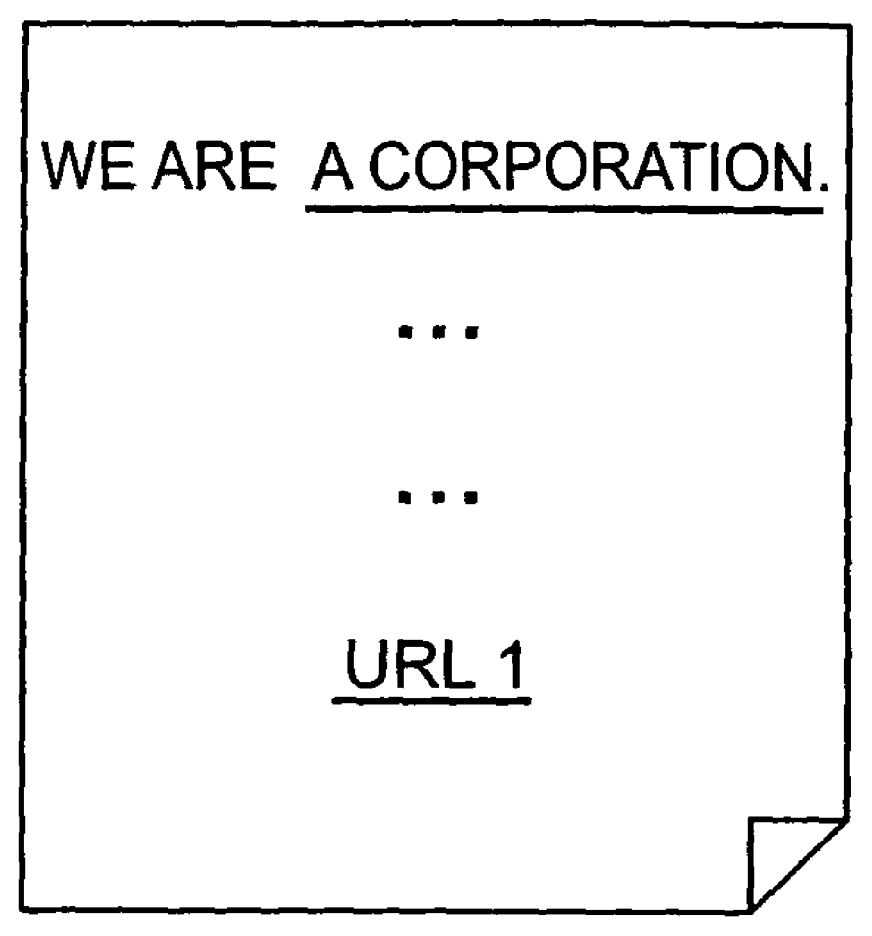

The information extraction by the information extractor 12 is not performed from the header of the e-mail, but from the main body of the e-mail. Specifically, in a case where the main body of the e-mail is as shown in FIG. 2, the information extractor 12 extracts "A Corporation" being the sender information and "URL1" being the URL information (the portions to be extracted are underlined in FIG. 2). This extraction may be performed, for example, by the keyword extraction technology based on pattern matching or by the natural language analysis technology. The information does not always have to be extracted from the main body of e-mail, but may also be extracted from the from address, logo, etc. in the header of e-mail. The sender information thus extracted is transmitted to the sender information reliability evaluator 14 in order to evaluate the reliability of the sender. The URL information extracted is transmitted to the URL information reliability evaluator 16 in order to evaluate the reliability of the URL. Since the above evaluations of reliabilities also use information to specify a recipient, the information to specify the recipient, e.g., a mail address of a destination, is also extracted and transmitted to the sender information reliability evaluator 14 and to the URL information reliability evaluator 16.

The contractual information database 13 is a database storing information of contractual relations between recipients and senders of e-mail. The information of contractual relations between recipients and senders of e-mail is information used for the sender information reliability evaluator 14 to evaluate the reliability of sender information. Namely, the contractual information database 13 is a reliability evaluation database storing information corresponding to the discrimination information, for evaluating the reliability of the discrimination information. A specific example of the information of contractual relations is information indicating correspondences between credit card companies and contractees thereof, or the like. Specifically, the information is stored in a table as shown in FIG. 3 in the contractual information database 13, whereby the contractual information database 13 retains the information. As shown in FIG. 3, the recipient information (e.g., mail addresses) and contract company names are stored in correspondence to each other in the table. The first row in the table of FIG. 3 indicates that "Recipient 1" has a contract with "A Corporation." The contractual information database 13 is implemented, for example, in such a manner that each recipient preliminarily registers the contractual information.

The sender information reliability evaluator 14 is a reliability evaluating means for evaluating the reliability of the sender information with reference to the information stored in the contractual information database 13. The sender information reliability evaluator 14 is also a database connecting means for connecting to the contractual information database 13, for referencing the contractual information database 13. The evaluation of the reliability is carried out according to a certain standard or rule preliminarily defined. A specific example of the evaluation will be described in the description of processing of the unwanted mail discriminating apparatus 10. The information about the evaluation is transmitted to the discriminator 17.

The access count database 15 is a database storing information of access counts to sites on the communication network. The information of access counts is stored in correspondence to URL information. The information of access counts is stored on a recipient-by-recipient basis. The information of access counts is information used for the URL information reliability evaluator 16 to evaluate the reliability of the URL information. Namely, the access count database 15 is a reliability evaluation database storing information corresponding to the discrimination information, for evaluating the reliability of the discrimination information. Specifically, the information is stored in a table as shown in FIG. 4 in the access count database 15, whereby the access count database 15 retains the information. As shown in FIG. 4, the URL information and access counts are stored in correspondence to each other in the table. This table is prepared for each recipient. The first row in the table of FIG. 4 indicates that "URL1" was accessed "5 times" in the past. The access count database 15 is implemented by preliminarily acquiring the information of access counts of each recipient from a proxy server or the like, or by recording the information at every access of each recipient.

The URL information reliability evaluator 16 is a reliability evaluating means for evaluating the reliability of the URL information, with reference to the information stored in the access count database 15. The URL information reliability evaluator 16 is also a database connecting means for connecting to the access count database 15, for referencing the access count database 15. The evaluation of reliability is carried out according to a certain standard or rule preliminarily defined. A specific example of the evaluation will be described in the description of processing of the unwanted mail discriminating apparatus 10. The information about the evaluation is transmitted to the discriminator 17.

The discriminator 17 is a discriminating means for discriminating whether e-mail received by the mail receiver 11 is unwanted mail, based on the reliability of the discrimination information evaluated by the sender information reliability evaluator 14 and by the URL information reliability evaluator 16. The discrimination is carried out according to a certain standard or rule preliminarily defined. A specific example of the discrimination will be described in the description of processing (unwanted mail discriminating method) of the unwanted mail discriminating apparatus 10.

In the present embodiment, the sender information reliability evaluator 14 and the URL information reliability evaluator 16 evaluate the reliability, for an e-mail group containing the same discrimination information (sender information and URL information). The discriminator 17 determines whether the e-mail group is unwanted mail, based on the reliability thus evaluated for the e-mail group. Therefore, when the information extractor 12 transmits the discrimination information to the sender information reliability evaluator 14 and to the URL information reliability evaluator 16, the information extractor 12 determines that a plurality of e-mail messages received are an e-mail group, and, for example, attaches an ID to identify the e-mail group so that they can also be identified as an e-mail group in subsequent processing. It is, however, noted that it is not always necessary to discriminate whether or not unwanted mail, for an e-mail group as described above, but it is also possible to discriminate in each of individual e-mail units.

The contractual information database 13 and the access count database 15 are arranged to be incorporated in the unwanted mail discriminating apparatus 10, but they may also be arranged separately from the unwanted mail discriminating apparatus 10. Furthermore, these databases may also be managed by another management entity different from the management entity that manages the unwanted mail discriminating apparatus 10.

Figure 5:
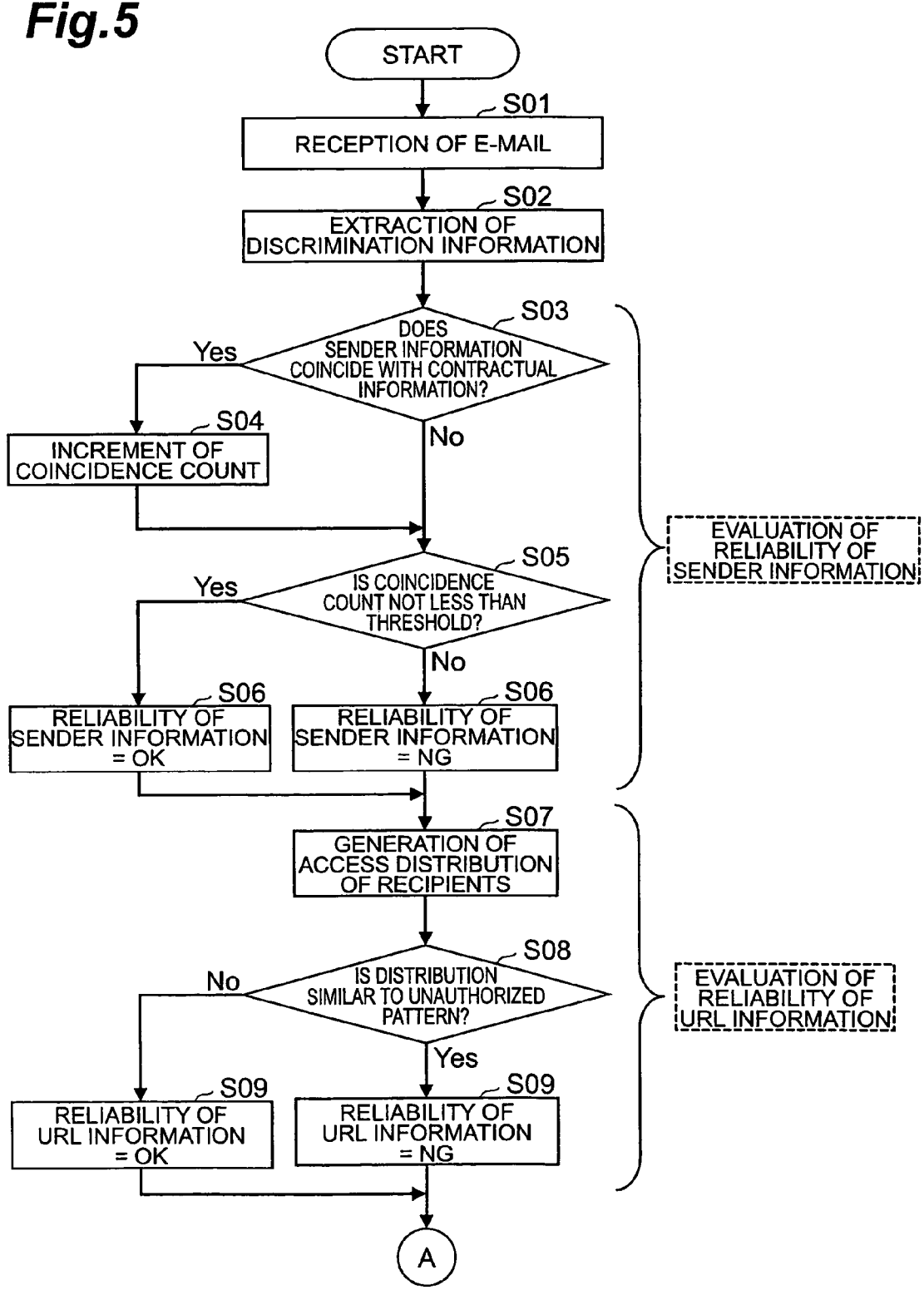
FIG. 5 is a flowchart showing a processing procedure executed in the unwanted mail discriminating apparatus in an embodiment of the present invention.
Figure 6:
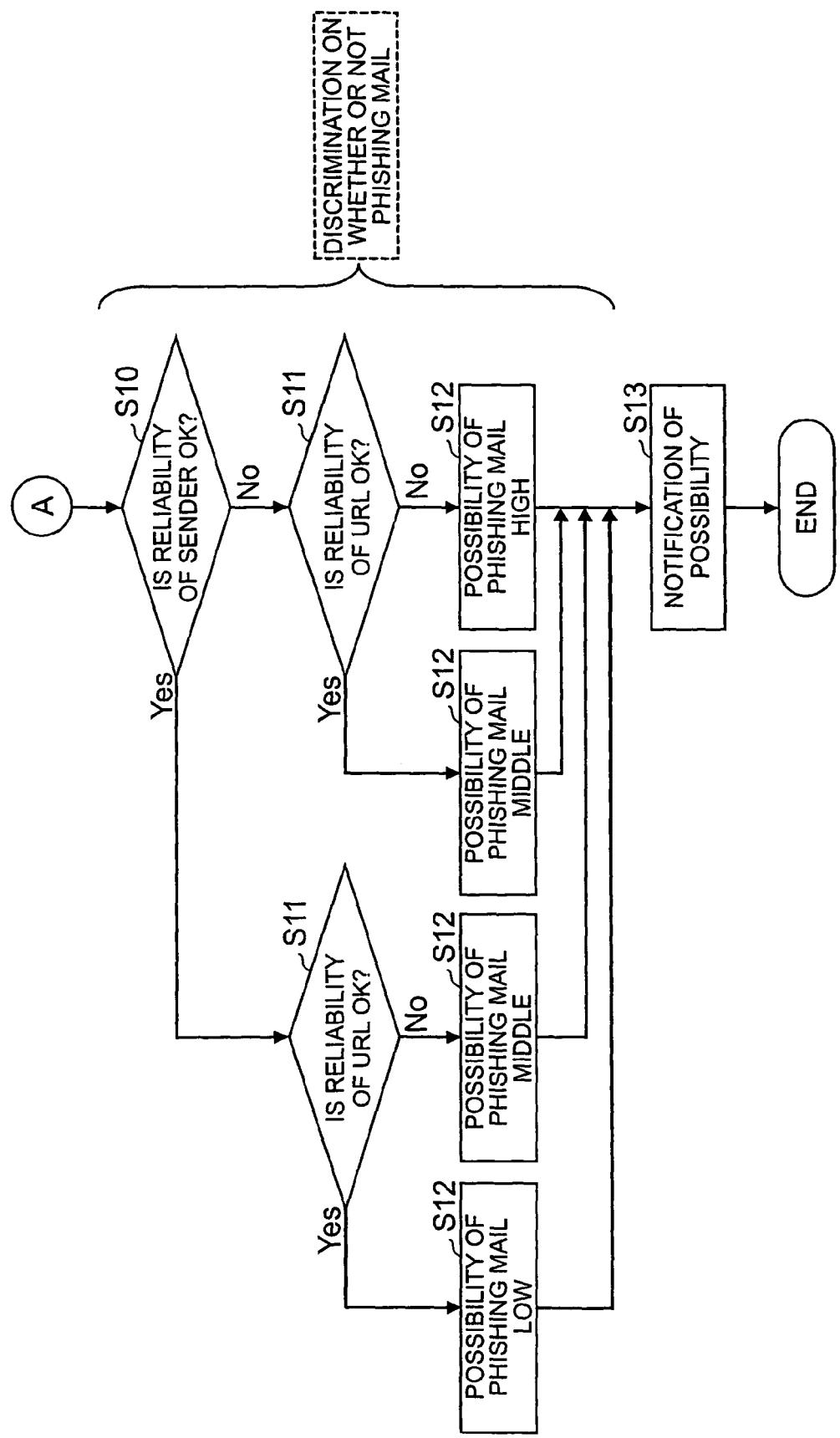
FIG. 6 is a flowchart showing a processing procedure executed in the unwanted mail discriminating apparatus in an embodiment of the present invention.

Subsequently, the processing in the unwanted mail discriminating apparatus 10 will be described with reference to the flowchart of FIGS. 5 and 6. The present processing is a processing procedure of receiving e-mail addressed to recipient communication terminal 30, which was transmitted from sender communication terminal 20, and discriminating whether the e-mail is unwanted mail.

First, in the unwanted mail discriminating apparatus 10 the mail receiver 11 receives e-mail (S01, mail receiving step). If a plurality of e-mail messages are transmitted to recipient communication terminal 30, the mail receiver 11 receives all the messages. The contents of the e-mail are transmitted to the information extractor 12.

Subsequently, the information extractor 12 extracts the discrimination information from each e-mail received (S02, information extracting step). The discrimination information extracted is, specifically, the sender information and URL information as described above. The sender information extracted is transmitted to the sender information reliability evaluator 14, and the URL information to the URL information reliability evaluator 16. The information extractor 12 also extracts the recipient information to specify the recipient of e-mail, and transmits it to the sender information reliability evaluator 14 and to the URL information reliability evaluator 16. As described above, some predetermined e-mail messages are handled as an e-mail group. In the description hereinafter, the processing will be described as that for the e-mail group.

Subsequently, the sender information reliability evaluator 14 evaluates the reliability of the sender information extracted (S03-S06, database connecting step and reliability evaluating step). This evaluation is carried out in the unit of the e-mail group and based on the number of contractual relations between recipients and the sender. The evaluation is, specifically, carried out as described below.

The sender information reliability evaluator 14 accesses the contractual information database 13 to reference the contractual information and determines, for each e-mail, whether the sender information extracted from the e-mail coincides with that in the contractual information (S03, database connecting step and reliability evaluating step). This determination is specifically carried out by determining whether the record of the contractual information database 13 contains an indication of a correspondence between the sender information and the recipient information extracted from the e-mail. For example, supposing the record of contractual information database 13 is as shown in FIG. 3, the sender information reliability evaluator 14 determines a coincidence where the sender information is "A Corporation" and where the recipient information is "Recipient 1." This determination is carried out for all the mail messages in the e-mail group, and correspondences are counted (with a coincidence, a coincidence count is incremented every determination thereof) (S04, reliability evaluating step). Instead of counting coincidence cases, the apparatus may also be arranged to count incongruous cases.

Subsequently, the sender information reliability evaluator 14 determines whether the foregoing coincidence count (or a ratio of the coincidence count to the number of all e-mail messages in the e-mail group) is not less than a predetermined threshold (S05, reliability evaluating step). This threshold is determined, for example, as described below.

Let n be the number of e-mail messages in the e-mail group, x be the foregoing coincidence count, and p be a probability of existence of a contractual relation between a recipient and the sender. Then a probability P(x) that the coincidence count is x, is expressed by an equation below. The probability p can be calculated, for example, from a share or the like in the business field of the sender.

$$P(x) = {}_nC_x(p)^x(1-p)^{n-x} \tag{1}$$

Figure 7:
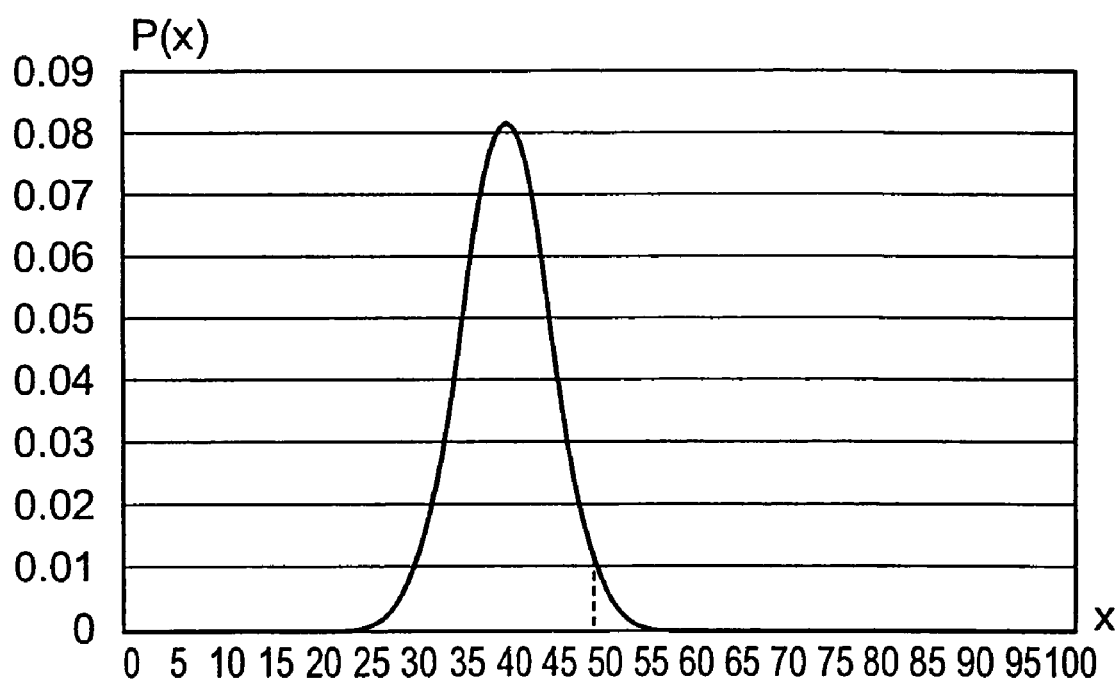
FIG. 7 is a graph showing a relation between coincidence count x and probability $P(x)$.

This equation represents the probability that, where a probability of occurrence of a certain event is p, the event occurs x times out of n occasions. The reason is that on the assumption of random transmission, the probability of occurrence of a coincidence described above for each e-mail is the foregoing probability p. For example, supposing n=100 and p=0.4, the relationship between x and probability P(x) in Eq (1) is given by the graph shown in FIG. 7. This means that, for example, the probability of x being not less than 50 is approximately 0.03, i.e., the probability that the coincidence count becomes 50 or more among a hundred e-mail messages, is about 3%. This also indicates that the probability that 50 or more e-mail messages out of 100 messages are transmitted at random, regardless of existence of a contract, is approximately 3%. Therefore, if the coincidence count x is not less than 50 when the number n of e-mail messages is 100, we can make such evaluation that the messages were not transmitted at random, i.e., that they were transmitted from a reliable sender. Therefore, when the safety factor is set at 3%, the threshold for the coincidence count can be set to 50.

Supposing the number of users registered in the contractual information database 13 is N, the probability P(x) of the coincidence count x can be expressed by an equation below.

$$P(x) = {}_nC_x \frac{\{n!/(n-x)!\} \cdot \{(N-n)!/((N-n)(n-x))!\}}{N!/(N-n)!} \quad (2)$$

Figure 8:
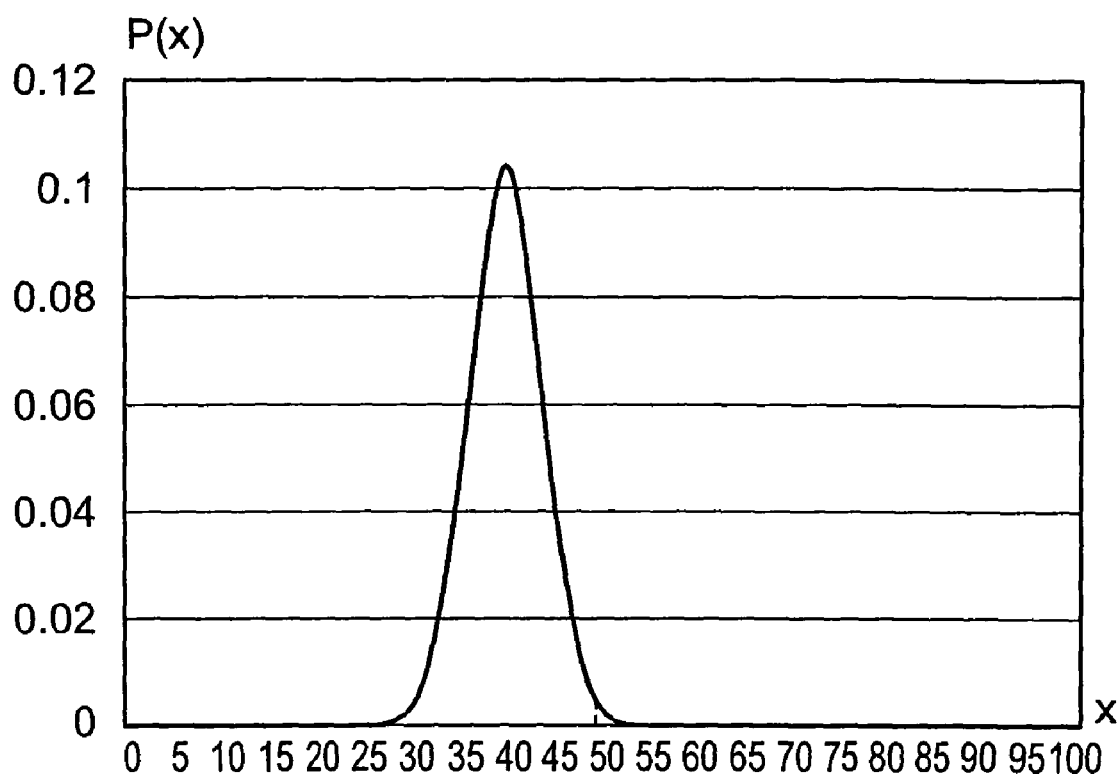
FIG. 8 is a graph showing a relation between coincidence count x and probability $P(x)$.

This equation represents the probability that, while selecting entries in order from a population N, x entries make a correspondence at the time of selection of n entries. For example, supposing N=250, n=100, and p=0.4, the relationship between x and probability P(x) in Eq (2) is given by the graph shown in FIG. 8. This means that the probability of x being not less than 50 is approximately 0.03, i.e., that, when a hundred people are selected at random from two hundreds and fifty people, the probability that the coincidence count becomes not less than 50 is about 3%. Therefore, if the coincidence count x is not less than 50 in the case where the number N of users is 250 and where the number n of e-mail messages is 100, we can make such evaluation that the e-mail messages were not transmitted at random, i.e., that they were transmitted from a reliable sender. Therefore, when the safety factor is set at 3%, the threshold for the coincidence count can be set to 50.

Figure 9:
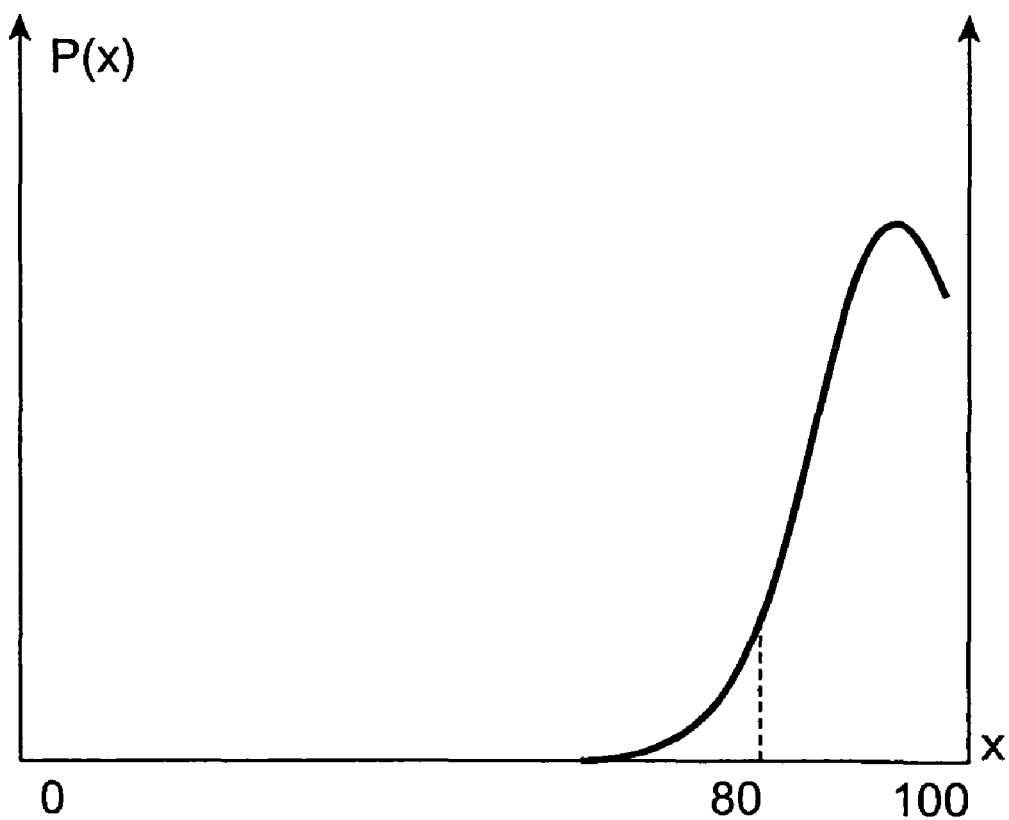
FIG. 9 is a graph showing a relation between coincidence count x and probability $P(x)$.

When statistics are taken for events of a specific company's having transmitted 100 e-mail messages along a client list owned thereby, let us suppose that the relation between x and probability P(x) be the graph shown in FIG. 9. It is seen from this figure that, for example, the probability of x being not more than 85 is approximately 0.03, i.e., the probability that the coincidence count (cases without change in the contract or the like) x for transmission of a hundred messages is not more than 85, is not more than 3%. Therefore, when the coincidence count x is not less than 85, we can make such evaluation that the e-mail massages were not transmitted at random, i.e., that they were transmitted from a reliable sender. Therefore, in the case where the threshold is set based on the graph of FIG. 9, if the safety factor is set at 3%, the threshold for the coincidence count can be set to 85.

When the aforementioned determination is that the coincidence count is not less than the threshold, the sender information reliability evaluator 14 makes such evaluation that the reliability of the sender information in the e-mail group is high (=OK) (S06, reliability evaluating step). On the other hand, when the coincidence count is less than the threshold, the sender information reliability evaluator 14 makes such evaluation that the reliability of the sender information in the e-mail group is low (=NG) (S06, reliability evaluating step). This information about the reliability of the sender information is transmitted to the discriminator 17.

Subsequently, the URL information reliability evaluator 16 evaluates the reliability of the URL information extracted (S07-S09, database connecting step and reliability evaluating step). This evaluation is carried out in the aforementioned unit of the e-mail group and based on a distribution of access counts to the site by recipients of the e-mail messages in the e-mail group. The evaluation is specifically carried out as described below.

Figure 10:
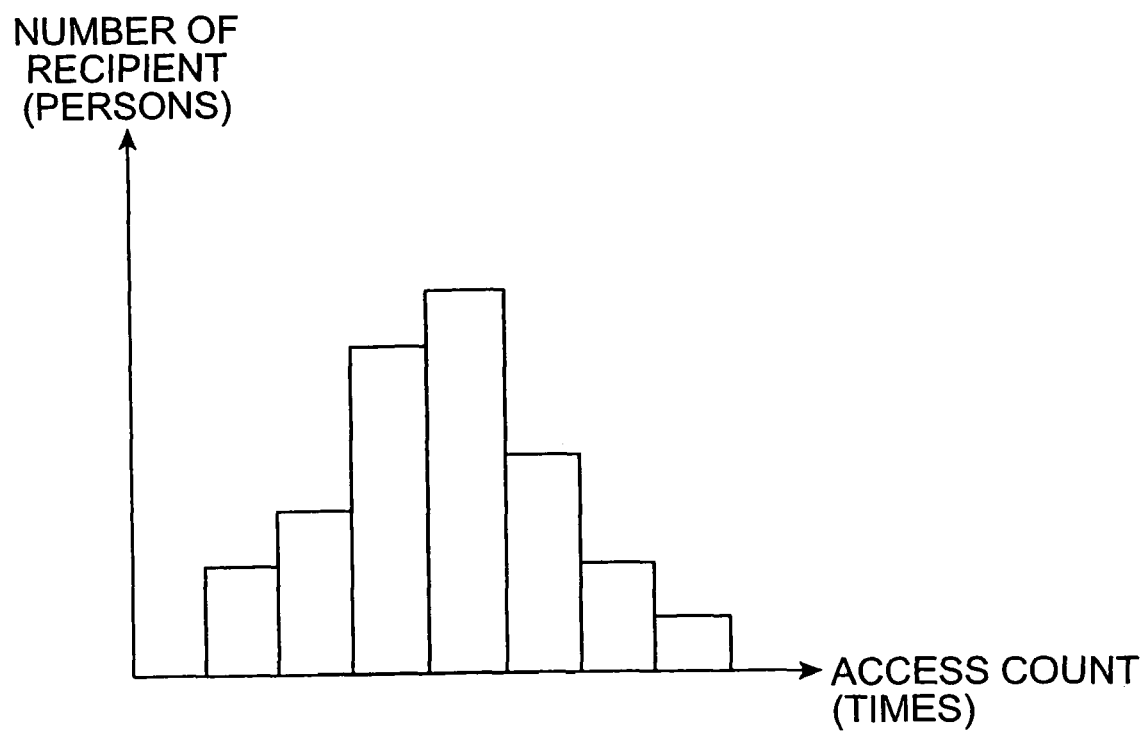
FIG. 10 is a graph showing a distribution of access counts to a site by recipients of e-mail.

The URL information reliability evaluator 16 accesses the access count database 15 to reference the information of access counts to the site to be accessed by the extracted URL, and generates a distribution of access counts to the site by the recipients of the e-mail (S07, database connecting step and reliability evaluating step). The distribution of access counts is a distribution of numbers of people against access counts, generated from the information of access counts to the site by each e-mail recipient stored in the table of the access count database 15 shown in FIG. 4 A graph to express the distribution of access counts generated is, for example, as shown in FIG. 10.

Subsequently, the URL information reliability evaluator 16 determines whether the distribution of access counts thus generated is similar to a preset pattern of distribution of access counts to sites used in phishing scams (S08, reliability evaluating step). The determination on whether or not similar can be specifically made, for example, by a method of pattern recognition or the like.

Figure 11:
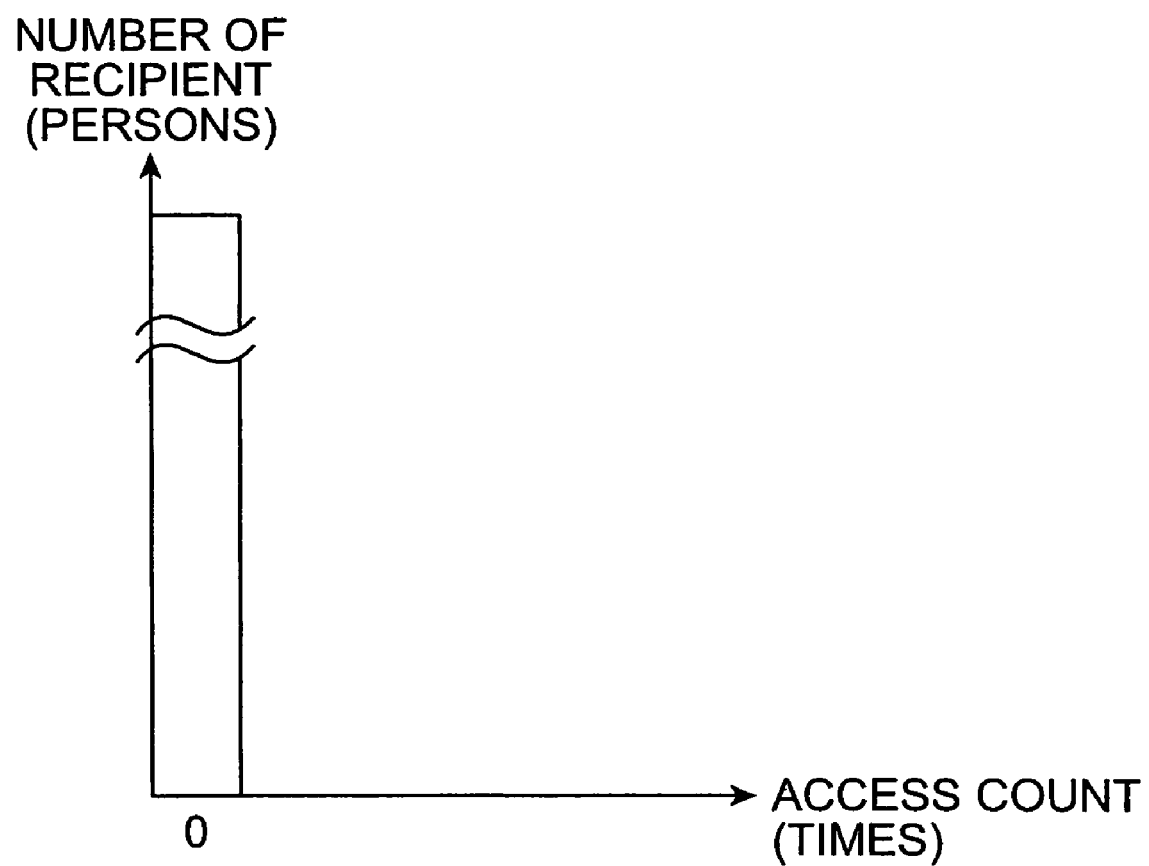
FIG. 11 is a graph showing a distribution of access counts to a site used in a phishing scam.

A pattern of distribution of access counts to a site used in a phishing scam is, for example, one in which all the recipients make no access at all as shown in FIG. 11. Even if there are access events (e.g., a recipient received phishing mail before and accessed a site from the URL included in the e-mail), the number of such cases is very small. This was verified by the survey results in the USA and the percentage was said to be approximately 19%. This result represents the percentage of accesses made even once before, and the percentage of people making access from actually existing URLs is considered to be much smaller. Therefore, as a method except for the method of comparing the patterns of distributions, it is also possible to determine whether the percentage of recipients having accessed the extracted URL is below 19%. When the percentage is below 19%, the next step makes such evaluation that the reliability of the URL information in the e-mail group is low.

When the above determination is that the distribution of access counts is not similar to the pattern of the distribution of access counts to the sites used in the phishing scams, the URL information reliability evaluator 16 makes such evaluation that the reliability of the URL information in the e-mail group is high (=OK) (S09, reliability evaluating step). On the other hand, if it is similar, the URL information reliability evaluator 16 makes such evaluation that the reliability of the URL information in the e-mail group is low (=NG) (S09, reliability evaluating step). This information about the reliability of the URL information is transmitted to the discriminator 17.

The evaluation of the reliability of the sender (S03-S06) and the evaluation of the reliability of the URL information (S07-S09) are not associated with each other, and either one of them may be performed first. It is also possible to perform them at a time in parallel.

Subsequently, the discriminator 17 discriminates whether the e-mail group is phishing mail, based on the reliabilities of the respective discrimination information pieces (S10-S12, discriminating step). The discrimination is specifically carried out by determining a possibility of phishing mail, as shown in the flowchart of FIG. 6. It will be described below.

First, the discriminator 17 determines whether the reliability of the sender information in the e-mail group is high (=OK) (S10, discriminating step). Subsequently, the discriminator 17 determines whether the reliability of the URL information in the e-mail group is high (=OK) (S11, discriminating step). When the two reliabilities both are high, the discriminator 17 determines that the possibility of the e-mail group being phishing mail is "low" (S12, discriminating step). When either one of the reliabilities is high, the discriminator 17 determines that the possibility of the e-mail group being phishing mail is "middle" (S12, discriminating step). When neither of the two reliabilities is high, the discriminator 17 determines that the possibility of the e-mail group being phishing mail is "high" (S12, discriminating step).

The present embodiment uses the both reliabilities of the sender information and URL information in the discrimination, but the discrimination may be performed using only either one of them. However, since use of only either one of them in the discrimination results in degradation of certainty of the discrimination, this method should be preferably applied to cases where either one of them is characteristic information and ensures the discrimination based thereon. When only either one is used in the discrimination, the evaluation of reliability may also be carried out as to only the one used in the discrimination.

The discriminator 17 informs the mail receiver 11 of the possibility of the e-mail group being phishing mail, acquired as described above. On the occasion of transmitting each e-mail in the e-mail group to the recipient communication terminal 30, the mail receiver 11 issues a warning to the recipient by notifying the recipient of the foregoing possibility of being phishing mail as well (S13). It is noted that the notification of the possibility does not always have to be made, but, instead thereof, it is also possible to perform, for example, a procedure of discarding the e-mail group with the high possibility of being phishing mail, in the unwanted mail discriminating apparatus 10. Alternatively, the apparatus may inquire of a third-party organization how to handle it. Furthermore, those transactions may be carried out in combination.

In the present embodiment, as described above, the unwanted mail discriminating apparatus 10 is configured to evaluate the reliability of the discrimination information extracted from e-mail and to discriminate whether the e-mail is phishing mail, based on the reliability evaluated. Namely, the present embodiment is to discriminate whether or not unwanted mail, based on the evaluation of the reliability of the discrimination information, instead of simply discriminating e-mail on the basis of the information such as the mail address or IP address. Therefore, whether transmitted mail is unwanted mail can be discriminated even in the case where unwanted mail is transmitted from a zombie PC with which the source is authenticated from the mail address or IP address. Since the appropriate discrimination can be made as described above, the measure against phishing mail can be efficiently implemented, e.g., it becomes feasible to notify the recipient of the fact.

When the discrimination information is extracted from the main body of e-mail as in the present embodiment, more appropriate discrimination information can be extracted in the discrimination of phishing mail. When the discrimination information is extracted from the main body of e-mail, there is no need for consideration to deception or the like in the information of the header.

When the discrimination information is the sender information and URL information as in the present embodiment, the discrimination information can be extracted more securely. The reason is that the phishing mail contains the sender information and URL information and, usually, e-mail contains the sender information and often contains the URL information as well. Therefore, this configuration enables easy practice of the present invention.

When the discrimination is performed for an e-mail group as in the present embodiment, whether or not unwanted mail is discriminated based on a plurality of e-mail messages, and therefore it is feasible to make the discrimination with higher reliability. It is also feasible to perform appropriate discrimination even in the case where the reliability evaluation database contains no high-accuracy information.

When the reliability of the sender information is evaluated based on the number of contractual relations between recipients and the sender as in the present embodiment, the reliability can be evaluated more securely and thus the discrimination can be made more appropriately. When the reliability of the sender information is evaluated based on the distribution of access counts to the site accessed through the URL by recipients as in the present embodiment, the reliability can be evaluated more securely and therefore the discrimination can be performed more appropriately.

If the contractual information stored in the contractual information database 13 is changed in part to be on the way of an update, part of the information can be incorrect, but no erroneous recognition will occur if the error is within the range of the statistical confidence interval. For example, even if the contractual information for ten recipients is in change among an e-mail group of a hundred e-mail messages and if a coincidence is made for all the other ninety messages, the coincidence count will exceed the threshold, regardless of the contractual information of the ten recipients in change, and thus correct discrimination can be made.

Similarly, if the access counts of URL are changed in part to be on the way of an update, part of the information can be incorrect, but no erroneous recognition will occur if the error is within the range of the statistical confidence interval. For example, where the access count is 0 for 90 recipients out of a hundred and even if the information of access counts of the ten recipients is in change, the coincidence count will exceed the threshold, regardless of the access count information of the ten recipients, and correct discrimination can be made. Even in a case where no information is registered for a certain user, the similarity of the distribution of access counts can also be determined even in the case of the access count of one recipient being 0, or even in the case of no data, because the determination is made based on the distribution of access counts of all the recipients. An acceptable number of data-missing recipients is determined, for example, by a threshold for the degree of similarity preliminarily set. As described above, phishing mail can be discriminated while instantly reacting with such a situation that the reliability evaluation database is in an update.

Incidentally, the break-even point of a phishing scam is determined by a response rate to e-mail. If the response rate can be decreased to 98.5% lower than the current response rate, the phishing scam will produce no profit, according to our estimation. Let $R_a$ be a discrimination rate to make a correct discrimination of phishing mail, $E_d$ be a damage to recipients, N be a total number of mail messages transmitted by a sender, $R_r$ be a response rate of recipients, $C_s$ be a transmission cost upon transmission of e-mail from a phishing fraud, and $C_p$ be a total cost except for the transmission cost for the scam by the phishing fraud. Then a generally preferred discrimination rate $R_a$ is represented by a formula below.

$$R_a > 1 - \frac{C_p + C_s N}{E_d N R_r} \quad (3)$$

The administrator of the unwanted mail discriminating apparatus 10 determines the discrimination rate $R_a$ based on the formula (3), and can determine the threshold for the coincidence count about the sender information and the threshold used in the determination of similarity of the distribution of access counts to URL, so as to realize the discrimination rate $R_a$.

The present embodiment handled the phishing mail as unwanted mail, but the object may be any unwanted mail other than the phishing mail as long as it can be determined to be unwanted mail from the contents of the mail.

MODIFICATION EXAMPLES

In the above-described embodiment, each reliability evaluating means of the sender information reliability evaluator 14 and the URL information reliability evaluator 16 evaluated the reliability by use of the discrimination information of all the e-mail messages in the e-mail group. However, when the evaluation is performed using all the e-mail messages in the e-mail group as described above and if the number of e-mail messages in the e-mail group is huge, the processing load will become enormous for the reference of the information stored in the reliability evaluation database (contractual information database 13 and access count database 15) by each reliability evaluating means and for the comparison between the information and the discrimination information.

In order to avoid such enormous processing load, the unwanted mail discriminating apparatus may also be configured as described below. In this configuration, each reliability evaluating means evaluates the reliability of the discrimination information for an e-mail group, based on e-mail messages the discrimination information of which has been transmitted till then, upon every transmission of the discrimination information from the information extracting means. Namely, the evaluating means evaluates the reliability by use of the discrimination information of some of e-mail messages in the e-mail group. The unwanted mail discriminating apparatus of this configuration will be described below.

Figure 12:
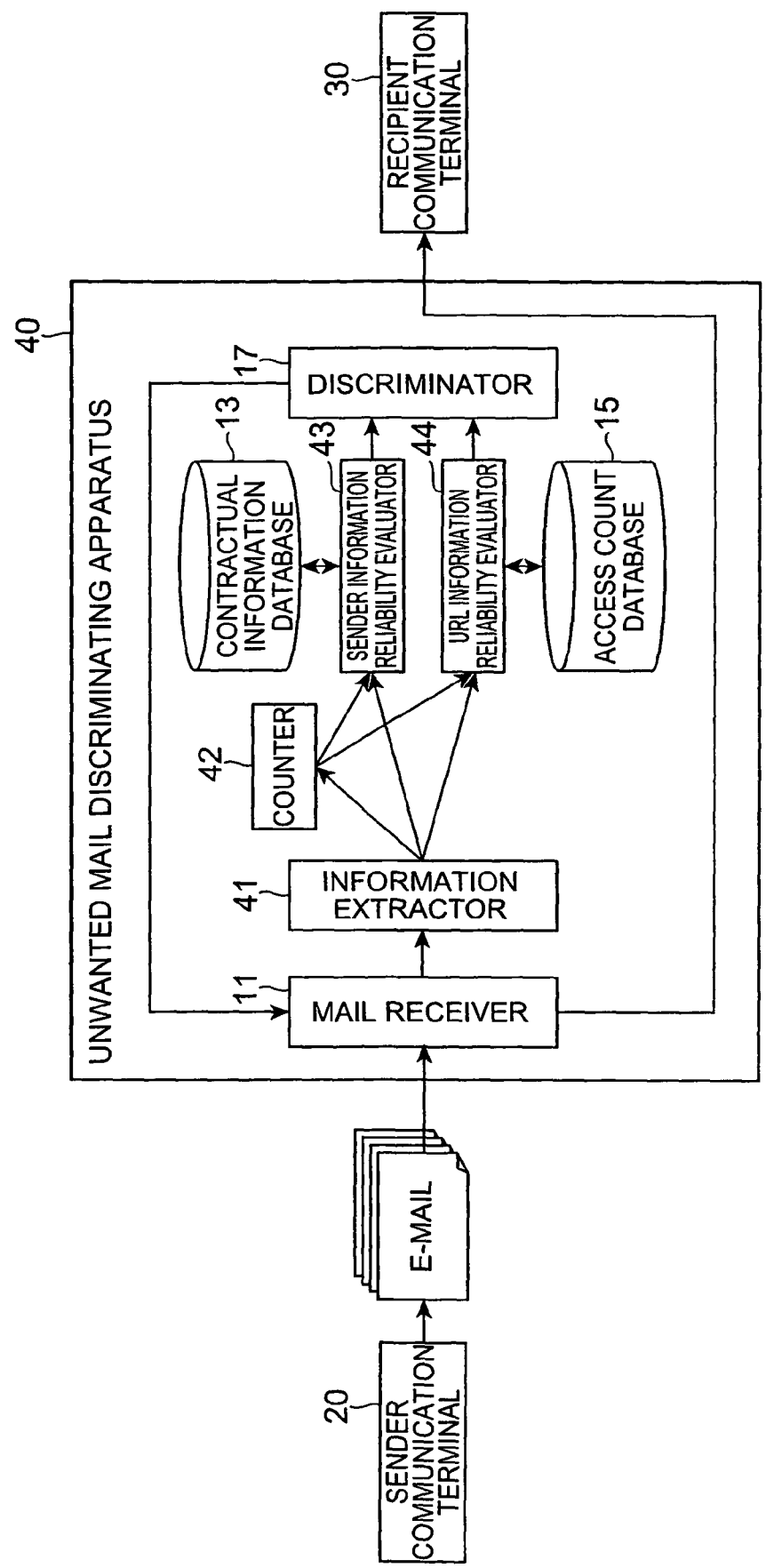
FIG. 12 is a diagram showing a configuration of an unwanted mail discriminating apparatus according to a modification example of the embodiment of the present invention.

FIG. 12 shows the mail discriminating apparatus 40 of the present modification example. The unwanted mail discriminating apparatus 40 further comprises counter 42 as a constituent element, in addition to those in the unwanted mail discriminating apparatus 10 of the embodiment described above. The mail discriminating apparatus 40 is different in the functions of information extractor 41, sender information reliability evaluator 43, and URL information reliability evaluator 44 from the unwanted mail discriminating apparatus 10 of the above-described embodiment. The mail discriminating apparatus 40 is the same as the unwanted mail discriminating apparatus 10 of the above-described embodiment except for the above-described differences. The differences will be described below from the unwanted mail discriminating apparatus 10 of the aforementioned embodiment.

The information extractor 41 extracts the discrimination information from each e-mail message and sequentially transmits the discrimination information to the sender information reliability evaluator 43 and to the URL information reliability evaluator 44, for each e-mail group. The information extractor 41 also transmits the discrimination information to the counter 42 upon every extraction of the discrimination information. The sequence of transmission of the discrimination information from the information extractor 41 can be, for example, an order of extraction of the discrimination information. Alternatively, some rule may be defined for determining the sequence, and the sequence may be determined according to the rule.

The counter 42 counts the number of discrimination information pieces transmitted from the information extractor 12 (the number of e-mail messages from which the discrimination information was extracted in the information extractor 12), for each e-mail group. The counting action is specifically performed as follows: a count is stored for each e-mail group and the count is incremented with every reception of discrimination information, for example. The information about the number of discrimination information pieces for each e-mail group thus counted is transmitted to the sender information reliability evaluator 43 and to the URL information reliability evaluator 44. If each of the sender information reliability evaluator 43 and the URL information reliability evaluator 44 is provided with the function similar to the counter 42, the counter 42 does not always have to be provided.

The reliability evaluating means of the sender information reliability evaluator 43 and the URL information reliability evaluator 44 evaluate the reliability of the discrimination information for the e-mail group, based on the e-mail messages the discrimination information of which has been transmitted heretofore, among the e-mail group, every time the discrimination information is extracted and transmitted by the information extractor 41. This evaluation is carried out based on a preset standard. A specific method of the evaluation will be described later.

The following will describe the processing of evaluation of reliability of discrimination information in the unwanted mail discriminating apparatus 40 of the present modification example. The present modification example will describe an example of the evaluation of reliability of sender information. This processing corresponds to S02-S06 (cf. FIG. 5) in the aforementioned embodiment. In the unwanted mail discriminating apparatus 40 the processing is carried out in the same manner as in the aforementioned embodiment, as to the steps (e.g., the reception of e-mail (S01) and the determination on whether or not phishing mail (S10-S12)) except for those described below.

Figure 13:
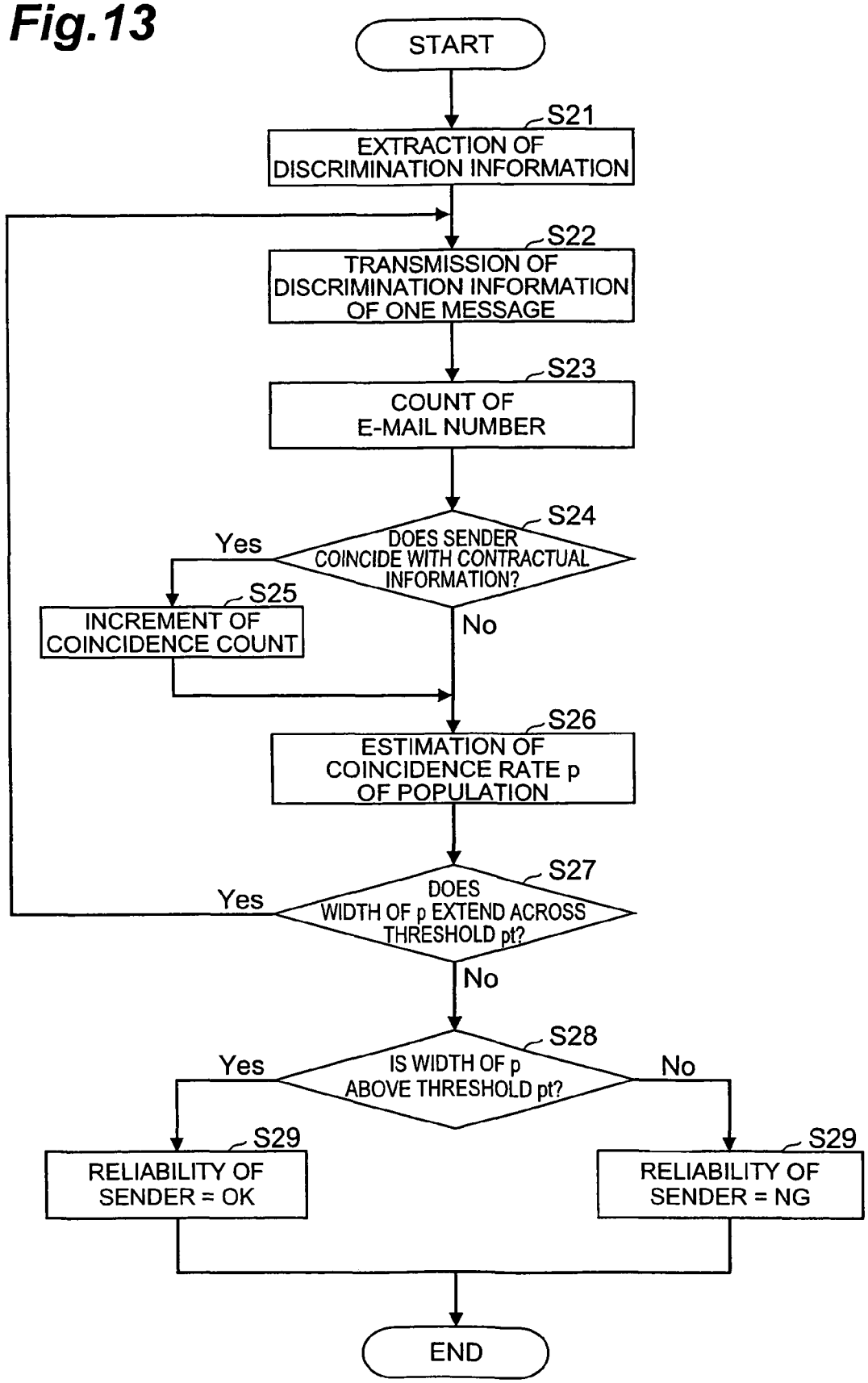
FIG. 13 is a flowchart showing a processing procedure executed in the unwanted mail discriminating apparatus according to the modification example of the embodiment of the present invention.

The processing will be described below with reference to the flowchart of FIG. 13. First, the information extractor 41 receives from the mail receiver 11, e-mail received by the mail receiver 11, and extracts the sender information being the discrimination information, from this e-mail (S21).

Subsequently, the information extractor 41 transmits the sender information of one e-mail message in the e-mail group as an object for the evaluation of reliability, to the counter 42 and to the sender information reliability evaluator 43 (S22). The counter 42 receives the sender information to count up the number of e-mail messages in the e-mail group as an object for the evaluation of reliability (S23). Specifically, the count is incremented by 1. The initial value of the count is 0. The information of the number of e-mail messages thus counted is transmitted to the sender information reliability evaluator 43.

Subsequently, the sender information reliability evaluator 43 receives the sender information from the information extractor 41 and receives the information of the number of e-mail messages in the e-mail group being an object for the evaluation of reliability, from the counter 42. The sender information reliability evaluator 43 accesses the contractual information database 13 to reference the contractual information in the same manner as in the process of S03 described above, and determines whether the sender information extracted from the e-mail is coincident with one of those included in the contractual information, for the received e-mail (S24). Subsequently, the sender information reliability evaluator 43 counts up the coincidence count (the coincidence count heretofore is incremented by 1 if a coincidence is made) (S25). Now let m be the coincidence count at this point, and n be the number of e-mail messages transmitted from the counter 42 (i.e., the number of coincidence determinations made by the sender information reliability evaluator 43). A coincidence rate of contractual relation in n e-mail messages is given by m/n.

Then the sender information reliability evaluator 43 evaluates the reliability of the sender information of the e-mail group by a technique using a statistical estimation as described below. First, the coincidence rate in the e-mail group as an object for the evaluation of reliability (which will be represented by p) is estimated according to the following relation, based on the above values (S26).

$$\frac{m}{n} - z\left(\frac{\alpha}{2}\right)\sqrt{\frac{\frac{m}{n}\left(1-\frac{m}{n}\right)}{n}} \leq p \leq \frac{m}{n} + z\left(\frac{\alpha}{2}\right)\sqrt{\frac{\frac{m}{n}\left(1-\frac{m}{n}\right)}{n}} \quad (4)$$

Here α is called a significance level, and a preset value thereof is set and stored in the sender information reliability evaluator 43. In general, α=5% (0.05) or 1% (0.01). z(α) is a point of 100 α% on both sides of a standard normal distribution. With α=0.05, z(0.05/2)=1.96. The value of α is preliminarily set and the value of z(α/2) is preliminarily stored in the sender information reliability evaluator 43.

For example, supposing m=9 and n=100, the coincidence rate p of the population (N mail messages) is estimated as follows by the above relation (4):

0.04≦p≦0.14.

Subsequently, the sender information reliability evaluator 43 evaluates the reliability of the sender information for the e-mail group, using a threshold determined by an equation preliminarily defined. Let $p_T$ be the threshold of p for evaluating the reliability of the e-mail group being an object for the evaluation of reliability. The threshold $p_T$ can be calculated from a probability p' of contractual relations between recipients and the sender. The probability p' is determined for each sender and can be preliminarily calculated from a share or the like in the business field of the sender, as described in the aforementioned embodiment. For example, where p'=0.1, the threshold $p_T$ can be set to (a value of x for the cumulative probability ΣP of 95% in Eq (5) of cumulative probability below)/100.

$$\Sigma P = \Sigma_{100} C_x (p')^x (1-p')^{100-x} \quad (5)$$

In the above example, where p'=0.1, x=15 for the cumulative probability of not less than 95%. Therefore, the threshold $p_T$ is set to 0.15. The sender information reliability evaluator 43 evaluates the reliability as described below, using this threshold.

Figure 14:
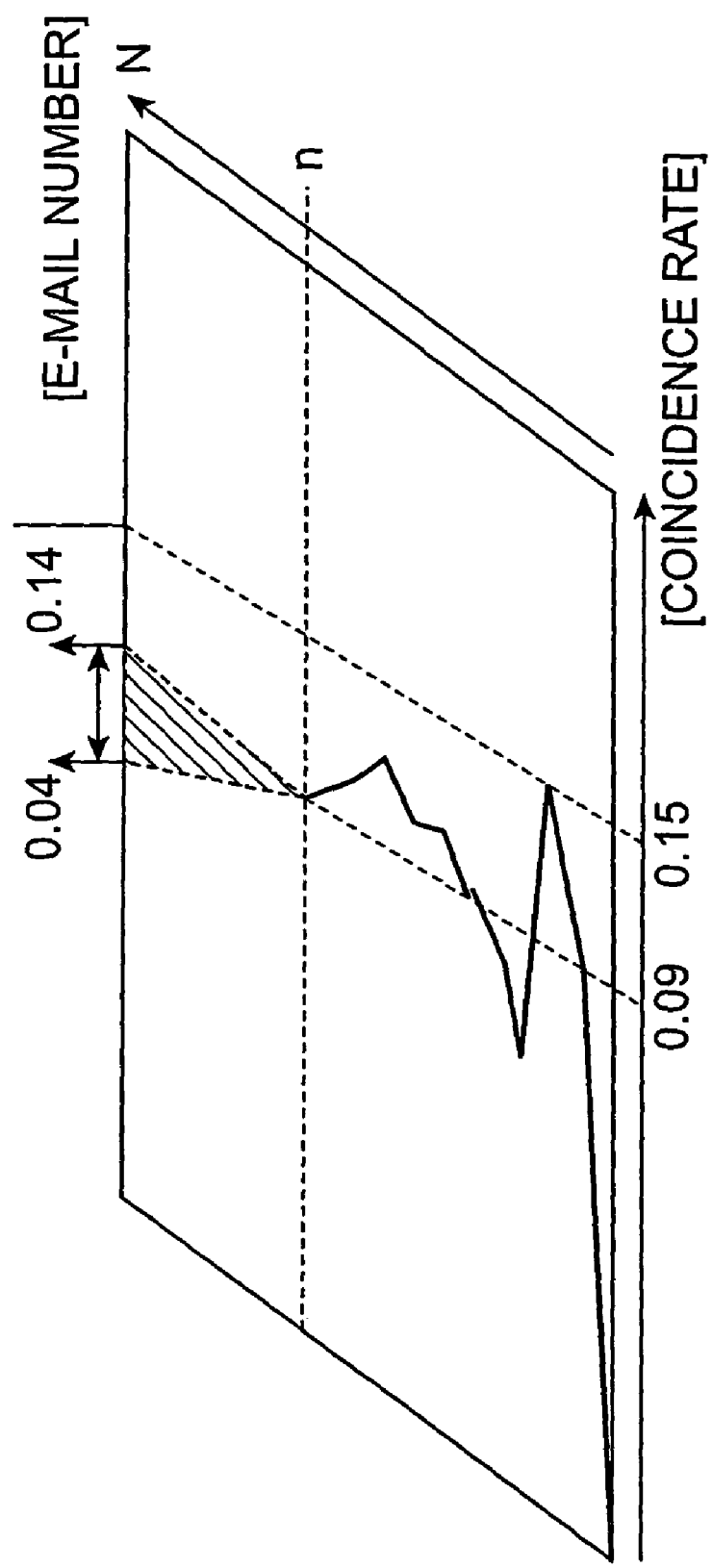
FIG. 14 is a graph showing a relation between the coincidence count and the number of e-mail.

First, the sender information reliability evaluator 43 determines whether the width of p extends across the threshold $p_T$ (S27). As shown in FIG. 14, the range of the above estimate of 0.04≦p≦0.14 excludes the threshold $p_T$=0.15. Namely, the width of p is determined not to extend across the threshold $p_T$.

Figure 15:
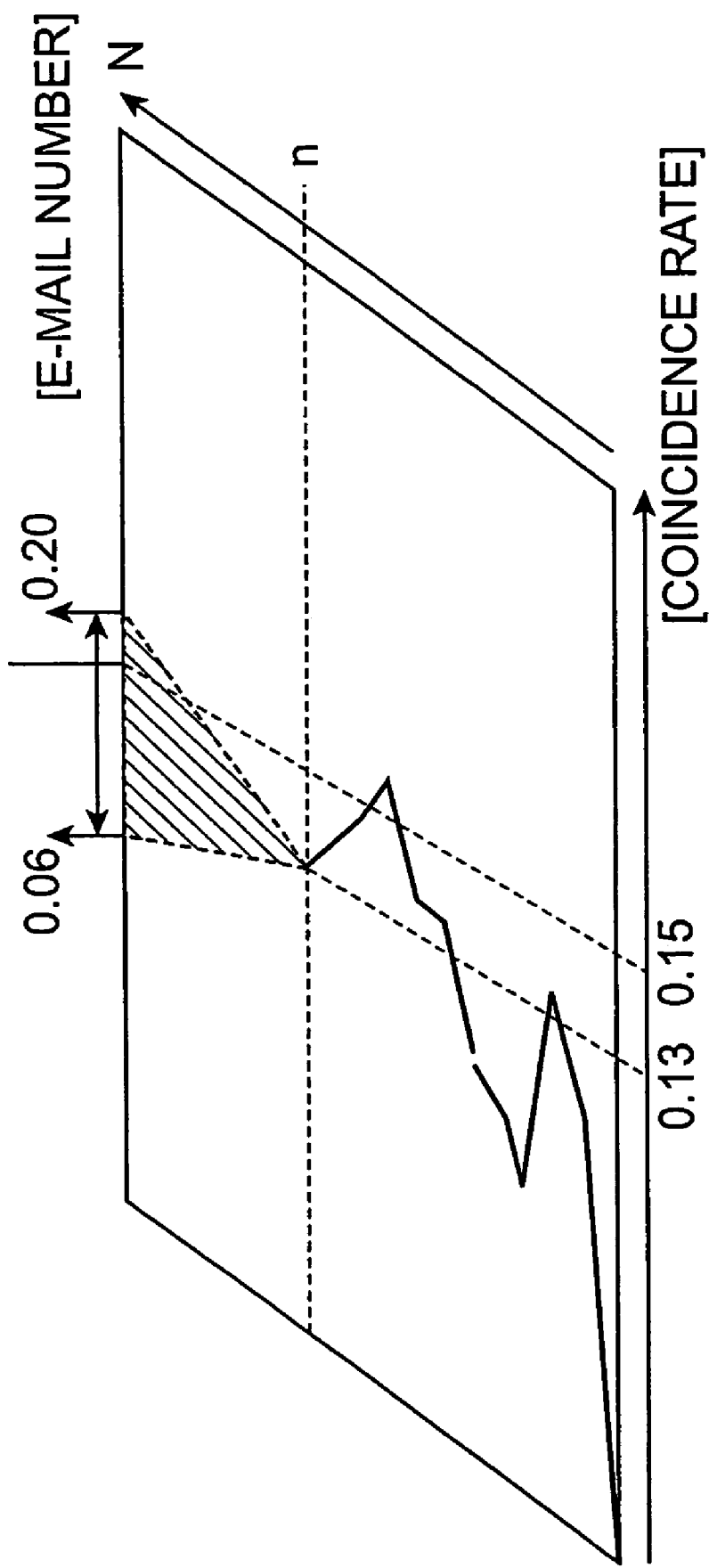
FIG. 15 is a graph showing a relation between the coincidence count and the number of e-mail.

When the width is determined not to extend across the threshold, the sender information reliability evaluator 43 determines whether the width of p is over the threshold $p_T$ (S28). As described above, the foregoing range of estimate p is not over the threshold $p_T$ (or is below the threshold). In that case, the sender information reliability evaluator 43 makes such evaluation that the reliability of the sender information in the e-mail group is low (=NG) (S29). On the other hand, when the range of estimate p is determined to be above the threshold $p_T$, the sender information reliability evaluator 43 makes such evaluation that the reliability of the sender information in the e-mail group is high (=OK) (S29). After the evaluation of the reliability of the sender information, the processing of evaluation of reliability is terminated and the sender information reliability evaluator 43 transmits the evaluated reliability to the discriminator 17. The discriminator 17 discriminates whether the e-mail group is phishing mail, based on this reliability (corresponding to the processing at S10-S12 in the aforementioned embodiment (cf. FIG. 6)).

Where n=100 and m=13, the estimate p of coincidence rate in the e-mail group is 0.06≦p≦0.20 according to the foregoing relation (4). As shown in FIG. 15, the range of the estimate p in this case extends across the threshold $p_T$, and thus the determination on whether the width of p extends across the threshold $p_T$ (S27) ends up with an affirmative determination. This state indicates that when the coincidence rate is derived for the population (N messages), the coincidence rate could or could not exceed the threshold. Therefore, the reliability of sender information cannot be evaluated at this point. For this reason, the apparatus returns to the process of transmission of discrimination information by the information extractor 41 (S22) to add the sender information of the next e-mail message to the sender information evaluated heretofore, then performs the foregoing processes (S23-S27), and again performs the determination by the sender information reliability evaluator 43.

Figure 16:
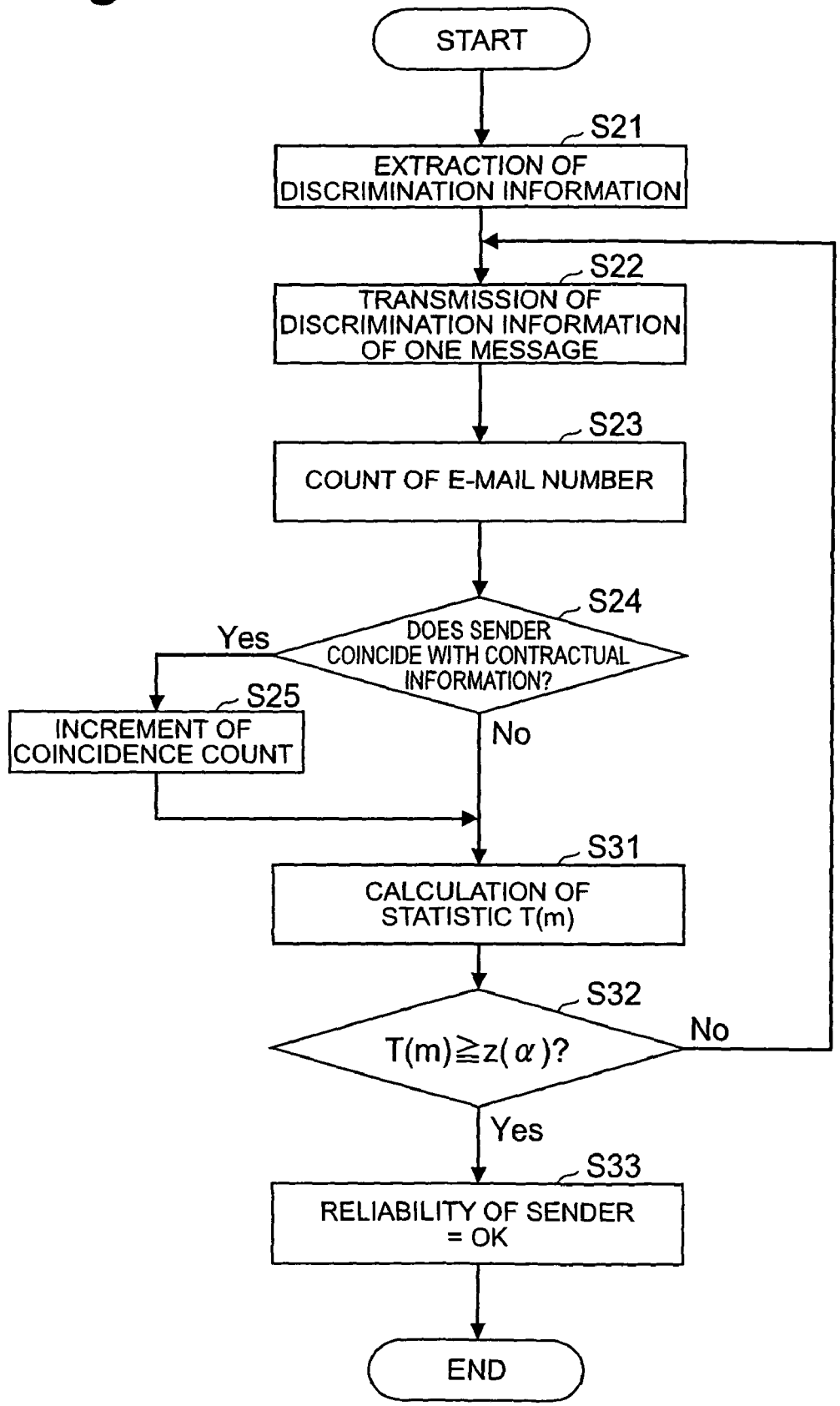
FIG. 16 is a flowchart showing a processing procedure executed in an unwanted mail discriminating apparatus according to another modification example of the embodiment of the present invention.

The above described the processing of evaluation of reliability of the sender information in the present modification. The following will describe another modification example. In this modification example the unwanted mail discriminating apparatus 40 has the configuration shown in FIG. 12, as the above modification example did. The unwanted mail discriminating apparatus 40 is different from the above, in the processing part of evaluation of reliability of sender information in the sender information reliability evaluator 43. The processing will be described using the flowchart of FIG. 16, with focus on the difference.

First carried out in the same manner as in the above modification example are the extraction of sender information (S21) and the transmission of sender information (S22) by the information extractor 41, the counting of the number of e-mail messages by the counter 42 (S23), the comparison between the contractual information and the sender information by the sender information reliability evaluator 43 (S24), and the counting of the coincidence count (S25).

Subsequently, the sender information reliability evaluator 43 evaluates the reliability of the sender information of the e-mail group by a technique using a statistical test as described below. First obtained, as described above, is the threshold $p_T$ for the coincidence rate p in the e-mail group, for evaluating the reliability of the e-mail group being an object for the evaluation of reliability. On this occasion, the following hypothesis is set up.

Hypothesis $H_0$: p=$p_T$=0.15 (in the case where the condition is the same as above)

In addition, an alternative hypothesis is also set as follows.

Alternative hypothesis $H_1$: p≧$p_T$=0.15 (in the case where the condition is the same as above)

If the hypothesis $H_0$ is rejected and if the alternative hypothesis $H_1$ is supported, it can be determined that the coincidence rate p exceeds the threshold $p_T$ (upper limit test). If statistic T(m)≧z(α) at this time, the hypothesis $H_0$ can be rejected with the significance level of α. The statistic T(m) is represented as follows.

$$T(m) = \frac{\frac{m}{n} - p_T}{\sqrt{\frac{p_T(1-p_T)}{n}}} \quad (6)$$

The sender information reliability evaluator 43 calculates the statistic T(m) from n, m, and $p_T$, in order to perform the above test (S31). Subsequently, the sender information reliability evaluator 43 determines whether the relation of T(m)≧z(α) holds (S32). The value of α is preliminarily set and the value of z(α) is preliminarily stored in the sender information reliability evaluator 43.

Specifically, for example, supposing n=100, m=50, $p_T$=0.15, and α=0.05, T(m)≈9.8≧z(0.05)=1.64, so that the hypothesis $H_0$ can be rejected. When the above condition is met as in this case, it can be determined that the coincidence rate p exceeds the threshold $p_T$, and the sender information reliability evaluator 43 makes such evaluation that the reliability of the sender information in the e-mail group is high (=OK) (S33).

When the above condition is not met, i.e., when T(m)<z(α), the hypothesis $H_0$ cannot be rejected. Namely, it is not sure whether the coincidence rate p exceeds the threshold $p_T$. This state indicates that when the coincidence rate is derived with the population (N messages), the coincidence rate could or could not exceed the threshold. Therefore, the reliability of the sender information cannot be evaluated at this point. For this reason, the apparatus returns to the process of transmission of discrimination information by the information extractor 41 (S22) to add the sender information of the next e-mail message to the sender information evaluated heretofore, performs the above processes (S23-S25, S31-), and again performs the determination by the sender information reliability evaluator 43. The above described the evaluation using the statistical test to make the evaluation that the reliability of the sender information is high (=OK), but it is also possible to make the evaluation that the reliability of the sender information is low (=NG) by a similar technique.

After the evaluation of reliability of sender information, the processing of evaluation of reliability is terminated and the sender information reliability evaluator 43 transmits the evaluated reliability to the discriminator 17. The discriminator 17 discriminates whether the e-mail group is phishing mail, based on this reliability (corresponding to the processes of S10 to S12 in the aforementioned embodiment (cf. FIG. 6)).

Figure 17:
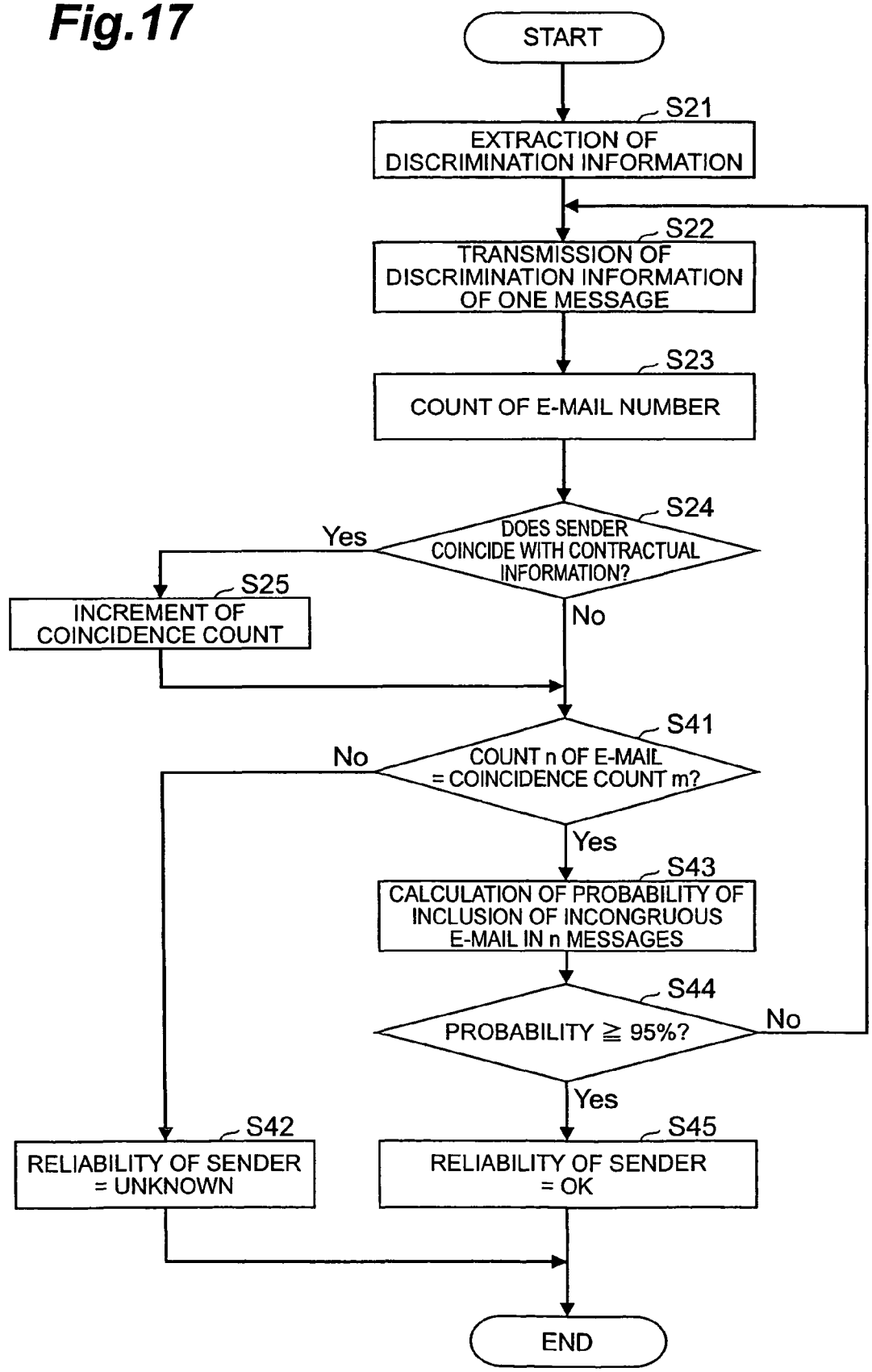
FIG. 17 is a flowchart showing a processing procedure executed in an unwanted mail discriminating apparatus according to still another modification example of the embodiment of the present invention.

The above described the processing of evaluation of reliability of sender information in the present modification. The following will describe still another modification example. In this modification example the unwanted mail discriminating apparatus 40 has the configuration shown in FIG. 12, as the above modification example did. The apparatus is different from the above, in the processing part of evaluation of reliability of sender information in the sender information reliability evaluator 43. The processing will be described using the flowchart of FIG. 17, with focus on the difference.

First carried out in the same manner as in the above modification example are the extraction of sender information (S21) and the transmission of sender information (S22) by the information extractor 41, the counting of the number of e-mail messages by the counter 42 (S23), the comparison between the contractual information and the sender information by the sender information reliability evaluator 43 (S24), and the counting of the coincidence count (S25).

Subsequently, the sender information reliability evaluator 43 evaluates the reliability of the sender information of the e-mail group by a technique using the proof by contradiction with a conditional probability as described below. In this technique a rate of noncoincidence of extracted sender information with those in the contractual information is preliminarily hypothesized. For example, the rate of noncoincidence is assumed to exceed 10%. Let us suppose that the coincidence is determined for n e-mail messages and consider a probability of incongruous e-mail included in the n messages under the hypothesis.

This probability p is a complementary event to the event of complete coincidence where n messages are arbitrarily determined from the e-mail group of the population (N messages) (from the hypothesis, the number M of incongruous mail messages is at least M=0.1 N), and therefore, it is given at least by the following equation.

$$p = 1 - \left(\frac{N-M}{N}\right)\left(\frac{N-M-1}{N-1}\right) \cdots \left(\frac{N-M-(n-1)}{N-(n-1)}\right) \quad (7)$$

For example, supposing N=45,000,000, p≧95% with n≧29.

This example means that when 29 or more mail messages are checked, a probability of inclusion of at least one incongruous e-mail message is not less than 95% (predetermined threshold). Conversely, if the check of 29 messages results in complete coincidence, the initial hypothesis "the rate of noncoincidence exceeds 10%" can be said to be inappropriate. Therefore, we can conclude that "incongruous mail is absent at a rate over 10% among the e-mail group being an object for the evaluation of reliability=the rate of noncoincidence of the e-mail group is less than 10%."

Using this logic, we can make the evaluation that the reliability of the sender information is high (=OK) if complete coincidence is made by checking 29 messages out of 45,000,000 mail messages, for example. In order to substantialize this logic, the following processing is carried out in the sender information reliability evaluator 43.

First, the sender information reliability evaluator 43 determines whether the number n of e-mail messages (number of coincidence determinations) counted by the counter 42 is equal to the coincidence count m (S41). Since this technique is based on the premise that the number n of coincidence determinations is equal to the coincidence count m, the reliability of the sender is determined to be not sure if they are determined not to equal (S42), and the evaluation of reliability in the sender information reliability evaluator 43 is terminated. When this technique is used, it is preferable to determine how to handle the case where the reliability of the sender is not sure, in the subsequent process.

When they are determined to equal, the sender information reliability evaluator 43 calculates the probability of inclusion of incongruent e-mail in n messages in accordance with Eq (7) (S43). The rate in the above hypothesis is preliminarily set and stored in the sender information reliability evaluator 43. On that occasion, the rate to be set is one that can appropriately evaluate the reliability. The number N of e-mail messages in the population is also preliminarily acquired from the information extractor 41 or the like.

Subsequently, the sender information reliability evaluator 43 determines whether the probability is not less than 95% (predetermined threshold). When the probability is not less than 95%, the sender information reliability evaluator 43 makes such evaluation that the reliability of the sender information in the e-mail group is high (=OK), for the above reason (S45). After the evaluation of the reliability of sender information, the processing of evaluation of reliability is terminated and the sender information reliability evaluator 43 transmits the evaluated reliability to the discriminator 17. The discriminator 17 discriminates whether the e-mail group is phishing mail, based on this reliability (corresponding to the processes of S10 to S12 in the aforementioned embodiment (cf. FIG. 6)).

When the probability is less than 95%, the reliability of the sender information cannot be evaluated at this point. For this reason, the apparatus returns to the process of transmission of discrimination information by the information extractor 41 (S22) to add the sender information of the next e-mail message to the sender information evaluated heretofore, performs the above processes (S23-S25, S41-), and again performs the determination by the sender information reliability evaluator 43. The above described the processing of evaluation of reliability of sender information in the present modification.

According to the configurations and processes, as described above, the processing load associated with the discrimination information can be reduced on the occasion of evaluating the reliability of the discrimination information. More specifically, it is feasible to reduce the number of processes for the reference to the information stored in the reliability evaluation database (contractual information database 13 and access count database 15) by each reliability evaluating means and for the comparison between the information and the discrimination information. Consequently, it is feasible to drastically reduce the processes in the unwanted mail discriminating apparatus 40.

For example, in the above-described example, the evaluation of reliability can be made by comparisons of the discrimination information of a hundred e-mail messages (and accesses to the reliability evaluation database in association therewith), independent of the number N of e-mail messages in the population. It is generally said that the unwanted mail such as phishing mail is sent by several million to tens of millions messages at a time. Assuming the total number N=10,000,000, the present invention permits the evaluation of reliability by comparisons of a hundred mail messages and enables the discrimination of unwanted mail, without comparisons of the remaining 9,999,900 messages. For this reason, the efficiency of processing in the evaluation of reliability is 10,000,000/100=100,000 times higher than in the case where all the e-mail messages were subjected to the reference and comparison of discrimination information.

The above modification examples all were arranged to evaluate the reliability of the sender information, but it is also possible similarly to evaluate the reliability of the URL information by the URL information reliability evaluator 44. In that case, instead of evaluating the reliability by the distribution of access counts as described in the aforementioned embodiment (not in the modification examples), the foregoing modification examples are applied by associating whether the user accessed the extracted URL, with whether the extracted sender information coincides with one in the contractual information. Whether the user accessed the extracted URL is determined through such an operation that the URL information reliability evaluator 44 accesses the access count database 15.

What is claimed is:

1. An unwanted mail discriminating apparatus comprising:
   mail receiving means for receiving e-mail;
   information extracting means for extracting discrimination information to be used to determine whether or not the e-mail is unwanted mail from the e-mail received by the mail receiving means, the discrimination information extracted by the information extracting means including sender information specifying a sender of the e-mail;
   database connecting means for connecting to a reliability evaluation database storing information corresponding to the discrimination information, for evaluating reliability of the discrimination information, the reliability evaluation database, to which the database connecting means connects, stores information of a contractual relation between a recipient and the sender of the e-mail;
   reliability evaluating means for evaluating the reliability of the discrimination information extracted by the information extracting means, with reference to the information stored in the reliability evaluation database, to which the database connecting means connects, the reliability evaluating means defining an e-mail group by identifying all e-mail having the same sender information, the reliability evaluating means determining a ratio of a number of e-mails in the e-mail group from the sender of the e-mail wherein exists a contractual relationship between the sender and a corresponding recipient to a total number of e-mails in the e-mail group received by the mail receiving means, the contractual relationship being stored in the reliability evaluation database; and
   discriminating means for discriminating whether the e-mail received by the mail receiving means is unwanted mail, based on the reliability of the discrimination information evaluated by the reliability evaluating means, the discriminating means determining the e-mail received by the e-mail receiving means is unwanted mail if the ratio is less than a threshold;
   wherein the reliability evaluating means evaluates for an e-mail group containing identical discrimination information, the reliability of the discrimination information contained in the e-mail group, and wherein the discriminating means discriminates whether the e-mail group is unwanted mail, based on the reliability of the discrimination information evaluated for the e-mail group by the reliability evaluating means;
   wherein the discrimination information extracted by the information extracting means contains link information for access to a site on a communication network, wherein the reliability evaluation database, to which the database connecting means connects, stores information of an access count to the site, for each recipient of the e-mail, and wherein the reliability evaluating means evaluates the reliability, based on a distribution of access counts to the site by recipients of the e-mail in the e-mail group;
   wherein the discriminating means determines the threshold based on the desired safety factor according to the following equation:

$$SF = {}_nC_x(n!/(n-x)!)\{(N-n)!/((N-n)(n-x))!\}/\{N!/(N-n)!\},$$

where SF is the desired safety factor, ${}_nC_x$ is a binomial coefficient, N is a number of users registered in the reliability evaluation database, n is the total number of e-mails in the group, and x/n is the threshold.

2. The unwanted mail discriminating apparatus according to claim 1, wherein the information extracting means extracts the discrimination information from a main body of the e-mail.

3. The unwanted mail discriminating apparatus according to claim 1, wherein the discrimination information extracted by the information extracting means contains sender information to specify a sender of the e-mail, wherein the reliability evaluation database, to which the database connecting means connects, stores information of a contractual relation between each recipient and the sender of the e-mail, and wherein the reliability evaluating means evaluates the reliability, based on a number of contractual relations between recipients and the sender of the e-mail in the e-mail group.

4. The unwanted mail discriminating apparatus according to claim 1, wherein the information extracting means sequentially transmits the extracted discrimination information to the reliability evaluating means, and wherein every time the reliability evaluating means receives the discrimination information transmitted from the information extracting means, the reliability evaluating means evaluates the reliability of the discrimination information for the e-mail group, based on a preset standard, from the e-mail the discrimination information that has been transmitted up to that time, among the e-mail group.

* * * * *